(12) United States Patent
Elbornsson Skogsstjarna et al.

(10) Patent No.: US 9,308,918 B2
(45) Date of Patent: Apr. 12, 2016

(54) OBJECT COLLISION WARNING SYSTEM AND METHOD FOR A MOTOR VEHICLE

(75) Inventors: Jonas Elbornsson Skogsstjarna, Ljungsbro (SE); Per Cronvall, Linköping (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 228 days.

(21) Appl. No.: 13/521,171

(22) PCT Filed: Dec. 22, 2010

(86) PCT No.: PCT/SE2010/051459
§ 371 (c)(1),
(2), (4) Date: Jul. 9, 2012

(87) PCT Pub. No.: WO2011/090414
PCT Pub. Date: Jul. 28, 2011

(65) Prior Publication Data
US 2012/0323478 A1    Dec. 20, 2012

(30) Foreign Application Priority Data

Jan. 25, 2010  (EP) .................................... 10000685

(51) Int. Cl.
*B60W 40/072* (2012.01)
*B60W 40/076* (2012.01)

(52) U.S. Cl.
CPC ........... *B60W 40/072* (2013.01); *B60W 40/076* (2013.01)

(58) Field of Classification Search
CPC ................ G08G 1/16; B60K 31/0066; B60W 2550/146; B60W 40/072; B60W 40/076; B60T 2210/24

USPC .................................................... 701/301, 302
See application file for complete search history.

(56) References Cited

U.S. PATENT DOCUMENTS 5,675,489 A * 10/1997 Pomerleau ...................... 701/28
6,265,991 B1 * 7/2001 Nishiwaki et al. ............ 340/903
(Continued)

FOREIGN PATENT DOCUMENTS

| | | |
|---|---|---|
| EP | 2 045 161 A1 | 4/2009 |
| JP | 2010-3002 | 1/2010 |

OTHER PUBLICATIONS

PCT International Search Report—Apr. 20, 2011.
(Continued)

*Primary Examiner* — Fadey Jabr
*Assistant Examiner* — Courtney Heinle
(74) *Attorney, Agent, or Firm* — Brinks Gilson & Lione

(57) ABSTRACT

An object collision warning system for a motor vehicle comprises a sensing means (11) adapted to sense a surrounding of the motor vehicle and a processing means (14) adapted to detect objects in a surrounding of the motor vehicle by processing a signal provided by the sensing means (11), to perform an estimation of a collision probability between the vehicle and the detected object, and to output a corresponding signal in case the collision probability is non-negligible. The processing means (14) is adapted to determine, after having passed a curve, information describing the passed curve, to store the curve describing information, and to use the curve describing information of at least one previously passed curve for determining the vehicle path in a current curve in the estimation of the collision probability.

12 Claims, 3 Drawing Sheets

(56) References Cited

U.S. PATENT DOCUMENTS

| | | | |
|---|---|---|---|
| 6,343,253 B1* | 1/2002 | Matsuura et al. | 701/70 |
| 6,553,282 B2* | 4/2003 | Shirai et al. | 701/1 |
| 6,718,259 B1* | 4/2004 | Khosla | 701/536 |
| 8,620,025 B2* | 12/2013 | Higuchi et al. | 382/103 |
| 2001/0020201 A1* | 9/2001 | Shirai et al. | 701/1 |
| 2003/0100992 A1* | 5/2003 | Khosla | 701/200 |
| 2005/0187705 A1* | 8/2005 | Niwa et al. | 701/208 |
| 2005/0216180 A1* | 9/2005 | Heinrichs-Bartscher | 701/117 |
| 2005/0225477 A1* | 10/2005 | Cong et al. | 342/70 |
| 2005/0273260 A1* | 12/2005 | Nishida et al. | 701/301 |
| 2006/0030987 A1* | 2/2006 | Akita | 701/41 |
| 2006/0085131 A1* | 4/2006 | Yopp et al. | 701/301 |
| 2007/0055446 A1* | 3/2007 | Schiffmann et al. | 701/301 |
| 2007/0129891 A1* | 6/2007 | Yano et al. | 701/301 |
| 2007/0233365 A1* | 10/2007 | Sekine | 701/200 |
| 2008/0114532 A1* | 5/2008 | Nishida et al. | 701/200 |
| 2008/0269992 A1* | 10/2008 | Kawasaki | 701/45 |
| 2009/0187290 A1* | 7/2009 | Moriizumi et al. | 701/1 |
| 2009/0248290 A1* | 10/2009 | Fukumoto et al. | 701/200 |
| 2009/0326820 A1* | 12/2009 | Shimizu | 701/301 |
| 2010/0030426 A1* | 2/2010 | Okita | 701/41 |
| 2010/0039722 A1* | 2/2010 | Lee et al. | 359/843 |
| 2010/0127841 A1* | 5/2010 | D'Ambrosio et al. | 340/435 |
| 2011/0246071 A1* | 10/2011 | Tsunekawa | 701/301 |
| 2011/0295548 A1* | 12/2011 | Takabayashi et al. | 702/142 |
| 2012/0185167 A1* | 7/2012 | Higuchi et al. | 701/461 |
| 2012/0206708 A1* | 8/2012 | Roelke et al. | 356/4.01 |
| 2012/0271483 A1* | 10/2012 | Samukawa et al. | 701/1 |
| 2012/0314071 A1* | 12/2012 | Rosenbaum et al. | 348/148 |
| 2013/0013184 A1* | 1/2013 | Morotomi et al. | 701/301 |

OTHER PUBLICATIONS

Publication—Combined Road Prediction and Target Tracking in Collision Avoidance—A. Eidehall, F. Gustafsson—IEEE Intelligent Vehicles Symposium, Proceedings, 2004.

* cited by examiner

OBJECT COLLISION WARNING SYSTEM AND METHOD FOR A MOTOR VEHICLE

CROSS-REFERENCE TO RELATED APPLICATIONS

This application claims priority to European Patent Application No. 10000685.7, filed Jan. 25, 2010 and PCT/SE2010/051459, filed Dec. 22, 2010.

FIELD OF THE INVENTION

The invention relates to an object collision warning system for a motor vehicle of the type having a sensing means adapted to sense a surrounding of the motor vehicle and a processing means, said processing means being adapted to detect objects in a surrounding of the motor vehicle by processing a signal provided by said sensing means, to perform an estimation of a collision probability between the vehicle and the detected object, and to output a warning signal in case the collision probability is non-negligible. The invention relates furthermore to a corresponding object collision warning method.

BACKGROUND OF THE INVENTION

US 2005 0225477 A1 discloses a vehicle collision warning system comprising a road curvature estimation subsystem for estimating the curvature of the roadway using measurements from host vehicle motion sensors, a target state estimation subsystem for estimating the state of a target vehicle on the basis of a radar measurement, and a control subsystem for determining whether or not the host vehicle is at risk of collision with the target, and if so, for determining and effecting corresponding action.

The goal of a pedestrian warning system is to warn the driver of the vehicle if there is a pedestrian on the road ahead of the vehicle or close to the road and walking towards the road. To be able to warn correctly for the pedestrian the system must know where the pedestrian is and where the road is ahead of the vehicle, which is particularly difficult in curves. For a warning to be meaningful for the driver, the warning must be activated several seconds before the predicted time of collision. However, predicting a curved path of the vehicle based on the vehicle dynamics generally works well at most a few hundred milliseconds ahead.

SUMMARY OF THE INVENTION

The object of the invention is to provide an object collision warning system and method with an improved prediction performance.

The invention solves this object with the features of the claims. The invention is based on the assumption that consecutive curves belonging to the same type of road have similar characteristics. Therefore, using stored curve parameters describing previously passed curves allows to predict how the next curve to be passed will behave already at the beginning of the curve, and not only in the middle of the curve as is the case if the vehicle dynamics alone are used to predict the vehicle path. Consequently, a collision risk in particular with an object in a curve can reliably be determined significantly earlier than in the prior art.

After having passed a curve, curve information describing this curve is preferably determined from measured vehicle motion variables, including but not limited to vehicle yaw as determined from a yaw sensor and/or vehicle speed, and stored preferably in an electronic memory. Curve information suited for describing a curve preferably includes one or more curve variables like curve length, curve radius and/or a prediction reliability.

Preferably the memory is adapted to store a plurality of information sets describing a plurality of previously passed curves. The use of information from a plurality of previously passed curves may lead to an enhanced quality of the vehicle path prediction in comparison to using information from the last passed curve only. If information from a plurality of previously passed curves is used, the curve information of different curves is preferably weighted in said estimation of the collision probability. In particular, the weight of the curve information is chosen smaller for a curve which has been passed longer ago, since the current curve may be assumed to be most similar to the most lastly passed curves.

The sensing means preferably is an imaging means adapted to record images from a surrounding of the motor vehicle. However, the invention is not limited to imaging means or vision systems, but is also applicable to non-vision sensing means based for example on lidar, radar or the like.

BRIEF DESCRIPTION OF THE DRAWINGS

In the following the invention shall be illustrated on the basis of preferred embodiments with reference to the accompanying drawings, wherein.

DETAILED DESCRIPTION OF THE INVENTION

Figure 1:
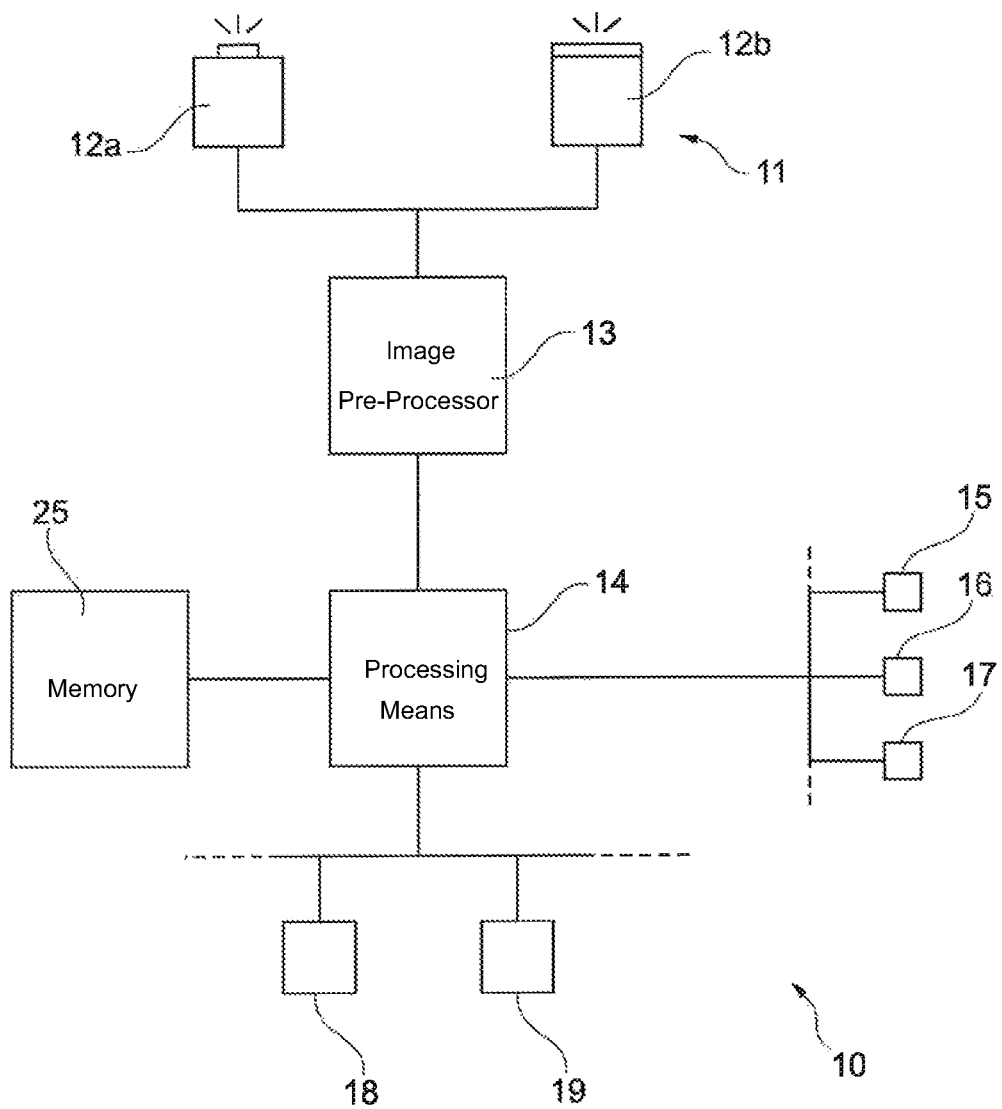
FIG. 1 shows in diagrammatic form a safety system for a motor vehicle.

The safety/vision system 10 is mounted in a motor vehicle and comprises an imaging means 11 for recording images of a region surrounding the motor vehicle, for example a region in front of the motor vehicle. Preferably the imaging means 11 comprises one or more optical and/or infrared imaging devices 12a, 12b, in particular cameras, where infrared covers near IR with wavelengths below 5 microns and/or far IR with wavelengths beyond 5 microns. Preferably the imaging means 11 comprises a plurality of imaging devices 12a, 12b in particular forming a stereo imaging means 11; alternatively only one imaging device forming a mono imaging means can be used.

The imaging means 11 is preferably coupled to an image pre-processor 13 adapted to control the capture of images by the imaging means 11, receive the electrical signal containing the image information from the image sensors 12a, 12b, warp pairs of left/right images into alignment and create disparity images, which per se is known in the art. The image pre-processor 13 may be realized by a dedicated hardware circuit. Alternatively the pre-processor 13, or part of its functions, can be realized in the electronic processing means 14.

The pre-processed image data is then provided to an electronic processing means 14 where image and data processing is carried out by corresponding software. In particular, possible objects surrounding the motor vehicle, such as pedestrians, other vehicles, bicyclists or large animals, are identified, which preferably includes classification and verification steps. The position of identified objects in the recorded images is tracked over time. Information relating to an identified object is preferably displayed to the driver on a display means 19.

Furthermore, an expected path of the vehicle is calculated on the basis of vehicle dynamics information obtained from vehicle sensors 15, 16, and 17 comprising a speed sensor 15, a yaw sensor 16 and/or a steering angle sensor 17. When the processing means 14 estimates on the basis of the position of an identified object in the scene and the expected path of the vehicle that there is a non-negligible risk of collision, the processing means 14 outputs a corresponding signal in order to activate or control one or more vehicle safety means 18 in a suitable manner. For example, means 18 could be in the form of a warning adapted to warn the driver is preferably activated. Such a warning may suitably provide optical, acoustical and/or haptical warning signals, which includes displaying an optical warning on the display means 19. Further safety means 18 may be activated or suitably controlled, for example restraint systems such as occupant airbags or safety belt tensioners; pedestrian airbags, hood lifters and the like; or dynamic vehicle control systems such as brakes.

The electronic processing means 14 is preferably programmed or programmable and may comprise a microprocessor or micro-controller. Expediently, the electronic processing means 14 has access to an electronic memory means 25. The image pre-processor 13, the electronic processing means 14 and the memory means 25 are preferably realized in an on-board electronic control unit (ECU) and may be connected to the imaging means 11 via a separate cable or alternatively via a vehicle data bus. In another embodiment the ECU and a camera of imaging means 12a, 12b can be integrated into a single unit. All steps from imaging, image pre-processing, image processing to activation or control of safety means 18 are performed automatically and continuously during driving in real time.

Figure 2:
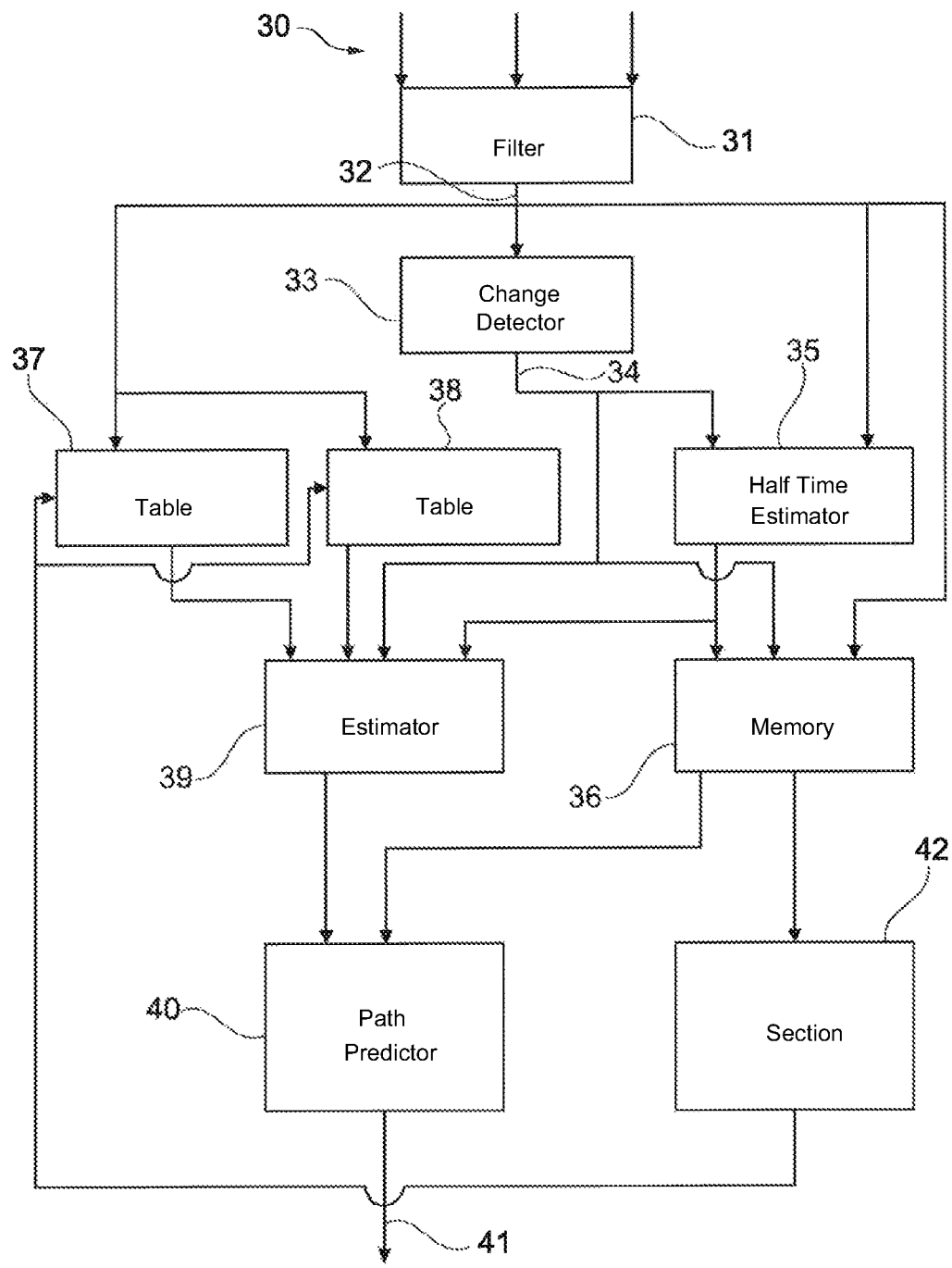
FIG. 2 shows a schematic diagram explaining the prediction of the forthcoming vehicle path.

The determination of an expected path of the vehicle in the processing means 14 is explained in detail using FIG. 2. The input values 30 are obtained from vehicle dynamics sensors 15 to 17 and may in particular comprise the vehicle speed, yaw rate and steering angle. The input values 30 are continuously updated within fixed time intervals, and input into a Kalman filter 31 providing filtered vehicle parameters 32, in particular a filtered yaw rate and filtered vehicle speed.

The filtered vehicle parameters 32 are provided to a change detector 33 which is adapted to detect changes between straight road and curve. Output 34 of the change detector 33 are the last start time of a curve, the last end time of a curve and an indicator indicating whether the vehicle currently is in a curve or on a straight road. From the last start time of a curve, the current vehicle speed and yaw rate, the time when the vehicle has passed half of the curve is estimated in the half time estimator 35. The start time and end time of the last curve, the half time output by the half time estimator 35, as well as the speed and yaw rate of the last curve are stored in a memory 36 which may be realized in the electronic memory means 25 shown in FIG. 1.

When the vehicle drives through a curve, the expected curve length of the current curve and the expected total curve bending/radius of the current curve can be extracted in corresponding lookup tables 37, 38 stored in a memory, for example memory means 25 shown in FIG. 1. In the table 37 values of curve length are stored for the ranges of yaw rate and speed occurring in practice. In the table 38 values of total curve bending are stored for the ranges of yaw rate and speed occurring in practice. The use of tables 37, 38 is preferred because it is easier to update tables based on new measurements in comparison to updating a corresponding algorithm.

Based on the information from the curve length table 37, the curve bending table 38 and the curve half time estimator 35, final values for the estimated curve length of the current curve and the bending of the current curve are calculated in the curve length and bending estimator 39. Based on the estimated curve length and curve bending, and information on the last curve stored in the memory 36, the path of the vehicle is predicted in the vehicle path predictor 40. The output 41 of the vehicle path predictor 40 may for example be longitudinal position and lateral position of the vehicle at certain forthcoming times. This vehicle path information 41 can be used for reliably estimating the probability of a collision with a detected object in front of the motor vehicle.

When a curve has ended, the exact curve length and curve bending of this last curve are calculated in the update section 42. Based on these exact curve values of the lastly passed curve, the update section 42 then calculates new values for the tables 37, 38 employing a general model of curve progression. As an example, the general model may be based on general construction requirements, such that a curve usually has a start section with a linearly increasing curvature, a middle section of essentially constant curvature and an end section with a linearly decreasing curvature; a certain minimum length of the road in terms of minimum time, for example 3 s, at the speed limit of the road; etc. The new values for the tables 37, 38 are preferably calculated on the basis of information not only of the ultimately passed curve, but on a plurality of lastly passed curves, where the influence of a curve is preferably weighted with a decreasing weight, for example an exponentially decreasing weight, the longer ago the curve has been passed. The new values for the tables 37, 38 are then written into the tables 37, 38 in order to complete the table update.

Figure 3:
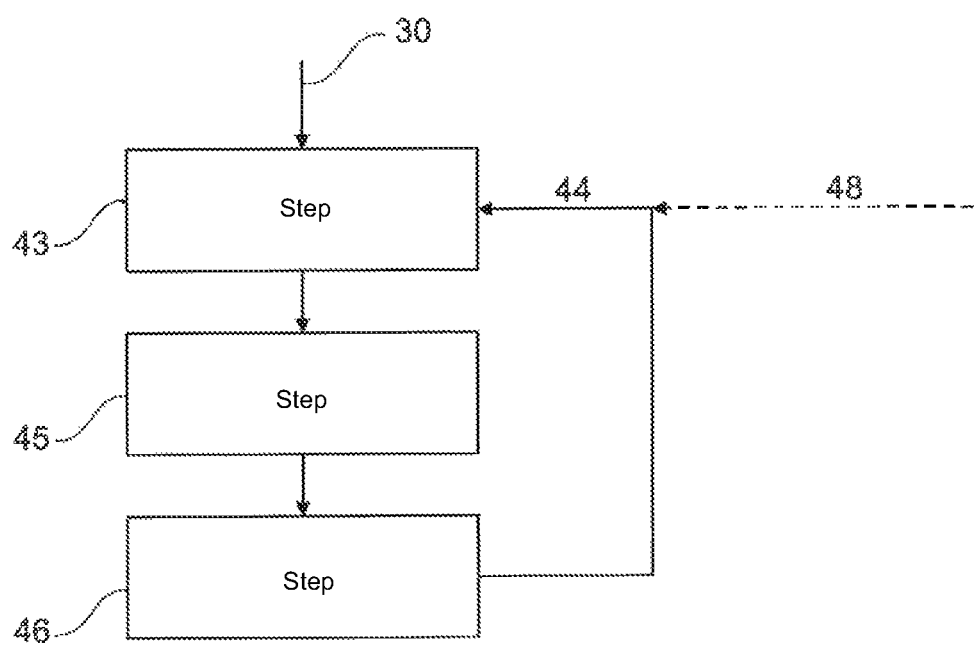
FIG. 3 shows a schematic diagram explaining the update of parameters used for the calculation of curve information.

FIG. 3 illustrates a general scheme for updating the parameters of a parametric curve describing model used in the calculation of curve information. When a curve is passed, curve describing variables like curve length, curve radius and/or a prediction error are calculated in step 43 using input values 30 describing the dynamics or kinematics of the vehicle, in particular vehicle speed, vehicle yaw and/or steering angle as measured with speed sensor 15, yaw sensor 16 and/or steering angle sensor 17; and on the basis of a parametric curve model describing how to predict a curve from measurement values 30 and variable input parameters 44. The determined curve variables are used in step 45 to calculate a loss function describing how good the model could predict the lastly passed curve. In step 46 update parameters which better fit the lastly passed curves are calculated based on the loss function, and fed back into the curve variable calculation 43. Initially, if no updated parameters are yet available, a set of initial parameters 48 are used as input parameters in the curve variable calculation 43.

While the above description constitutes the preferred embodiment of the present invention, it will be appreciated that the invention is susceptible to modification variation, and change without departing from the proper scope and fair meaning of the accompanying claims.

The invention claimed is:

1. An object collision warning system for a motor vehicle, comprising
    a sensing means for sensing a surrounding of the motor vehicle and a
    processing means for detecting objects in a surrounding of the motor vehicle by processing a signal provided by the sensing means, performing an estimation of a collision probability between the vehicle and the detected object, and outputting a corresponding signal in case the collision probability is non-negligible, the processing means distinguishing between a straight path and curves and further for determining, after the motor vehicle having passed a curve, information describing the passed curve, storing the curve describing information as curve variables, and using the curve describing information of at least two previously passed curves for determining the vehicle path in a current curve in the estimation of the collision probability, wherein only the curve information of different curves is weighted in the estimation of the collision probability and wherein the curve information of previously passed curves is weighted differently for different previously passed curves, a means for estimating when the vehicle has passed half of a curve, and a means for outputting a signal at least to a driver of the motor vehicle as a warning signal or to a safety device as a control signal in case the collision probability is non-negligible.

2. The warning system as claimed in claim 1, wherein the curve variables are determined from measured vehicle motion variables.

3. The warning system as claimed in claim 2, comprising the processing means having at least one table relating at least one of the curve variables to at least one of the vehicle motion variables over an operation range of the related at least one vehicle motion variable.

4. The warning system as claimed in claim 3 wherein the at least one of the curve variables comprises a curve length.

5. The warning system as claimed in claim 3 wherein the at least one of the curve variables comprises a curve radius.

6. The warning system as claimed in claim 3 wherein the at least one of the curve variables comprises a prediction error.

7. The warning system as claimed in claim 1, wherein a smaller weight factor is chosen for the curve information of a curve passed longer ago than of a curve passed more recently.

8. The warning system as claimed in claim 1 further comprising a change detector configured to detect changes between a straight road and a curve.

9. The warning system as claimed in claim 1 comprising a means for estimating when the vehicle is in a middle portion of a curve.

10. The warning system as claimed in claim 1, wherein the processing means is further configured for predicting the vehicle path based on the estimated curve variables.

11. The warning system as claimed in claim 1, wherein the sensing means is an imaging means configured to record images from a surrounding of the motor vehicle.

12. An object collision warning method for a motor vehicle, comprising:

sensing a surrounding of the motor vehicle by a sensing means, detecting objects in a surrounding of the motor vehicle by processing a signal provided as part of the sensing means, performing an estimation of a collision probability between the vehicle and the detected object, distinguishing between a straight path and curves;

determining, after having passed a curve, information describing the passed curve, the curve describing information including a curve length or both a curve start time and a curve end time, and an estimated time at which the vehicle has passed half of a curve, storing the curve describing information, and using the curve describing information of at least two previously passed curves for determining the vehicle path in a current curve in the estimation of the collision probability, wherein the curve information of different curves is weighted in the estimation of the collision probability and wherein the curve information of previously passed curves is weighted differently for different previously passed curves, and outputting, in case the collision probability is non-negligible, a corresponding signal at least to a driver of the motor vehicle as a warning signal or to a safety device as a control signal.

\* \* \* \* \*